(12) United States Patent
Gao et al.

(10) Patent No.: US 10,334,487 B2
(45) Date of Patent: Jun. 25, 2019

(54) DEVICE-TO-DEVICE RESOURCE CONFIGURATION INFORMATION PROCESSING METHOD, APPARATUS AND SYSTEM

(71) Applicant: ZTE CORPORATION, Shenzhen, Guangdong Province (CN)

(72) Inventors: Yin Gao, Shenzhen (CN); Dapeng Li, Shenzhen (CN); Ying Huang, Shenzhen (CN); Lin Chen, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 292 days.

(21) Appl. No.: 15/310,104

(22) PCT Filed: Sep. 29, 2014

(86) PCT No.: PCT/CN2014/087848
§ 371 (c)(1),
(2) Date: Nov. 10, 2016

(87) PCT Pub. No.: WO2015/172500
PCT Pub. Date: Nov. 19, 2015

(65) Prior Publication Data
US 2017/0150409 A1    May 25, 2017

(30) Foreign Application Priority Data
May 13, 2014   (CN) .......................... 2014 1 0202065

(51) Int. Cl.
*H04W 36/00* (2009.01)
*H04W 48/16* (2009.01)
(Continued)

(52) U.S. Cl.
CPC ..... *H04W 36/0083* (2013.01); *H04L 41/0803* (2013.01); *H04W 36/0072* (2013.01);
(Continued)

(58) Field of Classification Search
CPC ......... H04W 36/0072; H04W 36/0083; H04W 48/08; H04W 76/023; H04W 84/042;
(Continued)

(56) References Cited

U.S. PATENT DOCUMENTS 8,385,919 B1 * 2/2013 Jokinen ............. H04W 36/0066
                                                        455/435.1
2013/0288668 A1 * 10/2013 Pragada ................ H04W 12/06
                                                        455/426.1
(Continued)

FOREIGN PATENT DOCUMENTS

CN          103582127 A      2/2014
WO        2013012241 A2      1/2013
(Continued)

OTHER PUBLICATIONS

Samsung, "D2D Analynsis During Hanover", R3-14125, 3GPID TSG RAN WG3#84, sections 2.1 and 2.2, May 9, 2014(May 9, 2014).
(Continued)

*Primary Examiner* — Edan Orgad
*Assistant Examiner* — Nourali Mansoury
(74) *Attorney, Agent, or Firm* — Ling Wu; Stephen Yang; Ling and Yang Intellectual Property

(57) ABSTRACT

The present document discloses a Device-to-Device (D2D) resource configuration information processing method, apparatus and system, herein the method includes: when a source network device determines that a first terminal allowed to perform a D2D operation performs a handover operation, the source network device selecting a handover destination Public Land Mobile Network (PLMN) of the first terminal; and when the handover destination PLMN is the same as any one of PLMNs in an allowed D2D PLMN list, the source network device sending D2D resource con-
(Continued)

figuration information corresponding to the first terminal to a destination network device.

19 Claims, 4 Drawing Sheets

(51) Int. Cl.
*H04L 12/24* (2006.01)
*H04W 76/23* (2018.01)
*H04W 76/14* (2018.01)
*H04W 84/04* (2009.01)
*H04W 36/14* (2009.01)

(52) U.S. Cl.
CPC ........... *H04W 48/16* (2013.01); *H04W 76/23* (2018.02); *H04W 36/03* (2018.08); *H04W 36/14* (2013.01); *H04W 76/14* (2018.02); *H04W 84/042* (2013.01)

(58) Field of Classification Search
CPC ..... H04W 4/005; H04W 72/04; H04W 36/16; H04L 41/0803
See application file for complete search history.

(56) References Cited

U.S. PATENT DOCUMENTS

| | | | |
|---|---|---|---|
| 2014/0228034 A1* | 8/2014 | Gao | H04W 36/0072 455/437 |
| 2014/0235234 A1 | 8/2014 | Jang et al. | |
| 2014/0274066 A1* | 9/2014 | Fodor | H04W 36/08 455/437 |
| 2015/0223279 A1* | 8/2015 | Jiao | H04W 48/12 370/312 |

FOREIGN PATENT DOCUMENTS

| | | |
|---|---|---|
| WO | WO2013038325 A1 | 3/2013 |
| WO | WO2014068170 A1 | 5/2014 |

OTHER PUBLICATIONS

R3-132277; Mobility for D2D UEs; Ericsson; 3GPP TSG-RAN WG3 #82; San Francisco, USA, Nov. 11-15, 2013.

S2-131004; Key Issue-Authorization for ProSe Discovery; Huawei, Hisilicon; 3GPP TSG SA WG2 Meeting #96; Apr. 8-12, 2013, San Diego, California, USA.

* cited by examiner

DEVICE-TO-DEVICE RESOURCE CONFIGURATION INFORMATION PROCESSING METHOD, APPARATUS AND SYSTEM

TECHNICAL FIELD

The present document relates to a control technology in the field of mobile communication, in particular to a Device-to-Device (D2D) resource configuration information processing method, apparatus and system.

BACKGROUND

D2D technology can work at authorized frequency bands and unauthorized frequency bands and allow a plurality of user equipment supporting a D2D function (i.e., D2D User Equipment, D2D UE) to perform direct discovery/direct communication under a situation that there is network infrastructure or there is no network infrastructure. D2D technology usually includes D2D discovery technology and D2D communication technology, herein 1) D2D discovery technology refers to a technology which is used for judging/determining that two or more D2D user equipments are proximal or is used for judging/determining that first user equipment is proximal to second user equipment; and 2) D2D communication technology refers to a technology which can realize direct communication of partial or all communication data between D2D user equipments without going through network infrastructure.

During actual networking, network share allows operators to cooperatively construct a communication network and perform a flexible management to respective parts. During D2D resource management and maintenance, operators expect that this function can also be enjoyed in a network equivalent to a Home Public Land Mobile Network (HPLMN). Here, the equivalent network may refer to an EHPLMN and may also refer to a visited PLMN (VPLMN) that a Public Land Mobile Network of a network selected when a user roams and the HPLMN belong to the same operator and have the same country code. The UE can implement a D2D operation as long as the user is under the PLMN which is authorized for D2D discovery and/or communication.

However, since a solution to network share scenarios is not fully considered in a handover process, consequently D2D discovery, communication, monitoring and receiving functions of the UE on a destination side are influenced by the handover operation.

SUMMARY

In order to solve the above-mentioned technical problem, the embodiments of the present document provide a D2D resource configuration information processing method, apparatus and system.

The embodiment of the present document provides a D2D resource configuration information processing method, including:

when a source network device determines that a first terminal allowed to perform a D2D operation performs a handover operation, the source network device selecting a handover destination Public Land Mobile Network (PLMN) of the first terminal; and when the handover destination PLMN is the same as any one of PLMNs in an allowed D2D PLMN list, the source network device sending D2D resource configuration information corresponding to the first terminal to a destination network device.

In the above-mentioned solution, the method further includes: acquiring the allowed D2D PLMN list, herein, said acquiring includes: acquiring through interaction with a core network; or determining a serving PLMN, in which the first terminal receives D2D authorization information, as a D2D PLMN.

In the above-mentioned solution, the allowed D2D PLMN list includes: one or more PLMNs authorized to perform a D2D operation.

In the above-mentioned solution, the D2D resource configuration information includes: radio resource information needed for discovery and communication;

or radio resource information needed for operations of monitoring of discovery, receiving of discovery, monitoring of communication and receiving of communication.

In the above-mentioned solution, the D2D resource configuration information includes: information of the allowed D2D PLMN list.

In the above-mentioned solution, the method further includes: using an intersection set between a broadcast PLMN list corresponding to the destination handover cell of the first terminal and a serving PLMN and EPLMN list of the first terminal as the handover destination PLMN.

In the above-mentioned solution, the method further includes: selecting any one of PLMNs in the serving PLMN and EPLMN list of the first terminal as the handover destination PLMN.

The present document further provides a D2D resource configuration information processing method, including:

when a first terminal is handed over to a destination cell, a destination network device of the destination cell receiving D2D resource configuration information of the first terminal sent by a source network device; and the destination network device saving and updating the D2D resource configuration information of the first terminal such that UE uses the D2D resource configuration information in a next handover process.

In the above-mentioned solution, the D2D resource configuration information includes: radio resource information needed for discovery and communication; or radio resource information needed for operations of monitoring of discovery, receiving of discovery, monitoring of communication and receiving of communication.

In the above-mentioned solution, the D2D resource configuration information includes: information of an allowed D2D PLMN list.

The embodiment of the present document further provides a network device, including:

a judgment unit used to, when it is determined that a first terminal allowed to perform a D2D operation performs a handover operation, select a handover destination PLMN of the first terminal; and a handover unit used to, when the handover destination PLMN is the same as any one of PLMNs in an allowed D2D PLMN list, send D2D resource configuration information corresponding to the first terminal to a destination network device.

In the above-mentioned solution, the network device further includes: a receiving unit used to acquire the allowed D2D PLMN list, herein, said acquiring includes: acquiring through interaction with a core network; or determining a serving PLMN in which the first terminal receives D2D authorization information as a D2D PLMN.

In the above-mentioned solution, the allowed D2D PLMN list includes: one or more PLMNs authorized to perform a D2D operation.

In the above-mentioned solution, the D2D resource configuration information includes: radio resource information needed for discovery and communication;

or radio resource information needed for operations of monitoring of discovery, receiving of discovery, monitoring of communication and receiving of communication.

In the above-mentioned solution, the D2D resource configuration information includes:

information of the allowed D2D PLMN list.

In the above-mentioned solution, the handover unit is further used to use an intersection set between a broadcast PLMN list corresponding to the destination handover cell of the first terminal and a serving PLMN and EPLMN list of the first terminal as the handover destination PLMN.

In the above-mentioned solution, the handover unit is used to select any one of PLMNs in the serving PLMN and EPLMN list of the first terminal as the handover destination PLMN.

The embodiment of the present document further provides a network device, including:

a receiving unit used to, when a first terminal is handed over to a destination cell managed by the first terminal, receive D2D resource configuration information of the first terminal sent by a source network device; and a storage unit used to save and update the D2D resource configuration information of the first terminal.

In the above-mentioned solution, the D2D resource configuration information includes: radio resource information needed for discovery and communication; or radio resource information needed for operations of monitoring of discovery, receiving of discovery, monitoring of communication and receiving of communication.

In the above-mentioned solution, the D2D resource configuration information includes: information of an allowed D2D PLMN list.

The embodiment of the present document further provides a D2D resource configuration information processing system, including:

a source network device used to, when it is determined that a first terminal allowed to perform a D2D operation performs a handover operation, select a handover destination PLMN of the first terminal; and when the handover destination PLMN is the same as any one of PLMNs in an allowed D2D PLMN list, send D2D resource configuration information corresponding to the first terminal to a destination network device; and the destination network device used to, when the first terminal is handed over to a destination cell, receive the D2D resource configuration information of the first terminal sent by the source network device; and save and update the D2D resource configuration information of the first terminal.

In the above-mentioned solution, the source network device includes:

a judgment unit used to, when it is determined that a serving PLMN of the first terminal to be accessed is the same as any one of PLMNs in the allowed D2D PLMN list, determine the first terminal as a terminal allowed to perform a D2D operation; and a handover unit used to, when it is determined that the first terminal allowed to perform the D2D operation performs a handover operation and a selected handover destination PLMN of the first terminal is the same as any one of PLMNs in the allowed D2D PLMN list, send the D2D resource configuration information corresponding to the first terminal to the destination network device.

In the above-mentioned solution, the source network device further includes: a receiving unit used to acquire the allowed D2D PLMN list, herein said acquiring includes: acquiring through interaction with a core network; or determining a serving PLMN in which the first terminal receives D2D authorization information as a D2D PLMN.

In the above-mentioned solution, the allowed D2D PLMN list includes: one or more PLMNs authorized to perform a D2D operation.

In the above-mentioned solution, the D2D resource configuration information includes: radio resource information needed for discovery and communication;

or radio resource information needed for operations of monitoring of discovery, receiving of discovery, monitoring of communication and receiving of communication.

In the above-mentioned solution, the D2D resource configuration information includes: information of the allowed D2D PLMN list.

In the above-mentioned solution, the handover unit is further used to use an intersection set between a broadcast PLMN list corresponding to the destination handover cell of the first terminal and a serving PLMN and EPLMN list of the first terminal as the handover destination PLMN.

In the above-mentioned solution, the handover unit is further used to select any one of PLMNs in the serving PLMN and EPLMN list of the first terminal as the handover destination PLMN.

In the above-mentioned solution, the destination network device includes:

a receiving unit used to, when the first terminal is handed over to the destination cell managed by the first terminal, receive the D2D resource configuration information of the first terminal sent by the source network device; and a storage unit used to save and update the D2D resource configuration information of the first terminal.

The D2D resource configuration information processing method, apparatus and system provided by the embodiments of the present document can process the D2D resource configuration information in a terminal handover process, thus the terminal may continuously implement the D2D function in the destination network device which satisfies conditions after handover is completed, the expectation, of operators, that the processing of D2D under a plurality of PLMNs allowed for D2D operation is equivalent to the processing under the main PLMN is achieved, the effect that the destination side effectively allocates D2D operation resources for the terminal in time according to the D2D resource configuration information of the terminal is fully realized, the D2D discovery, communication, monitoring and receiving functions of the terminal on the destination side are prevented from being influenced by handover, and the network optimization processing efficiency is improved.

DETAILED EMBODIMENTS

The present document will be further described below in detail with reference to the drawings in combination with specific embodiments.

Embodiment 1

Figure 1:
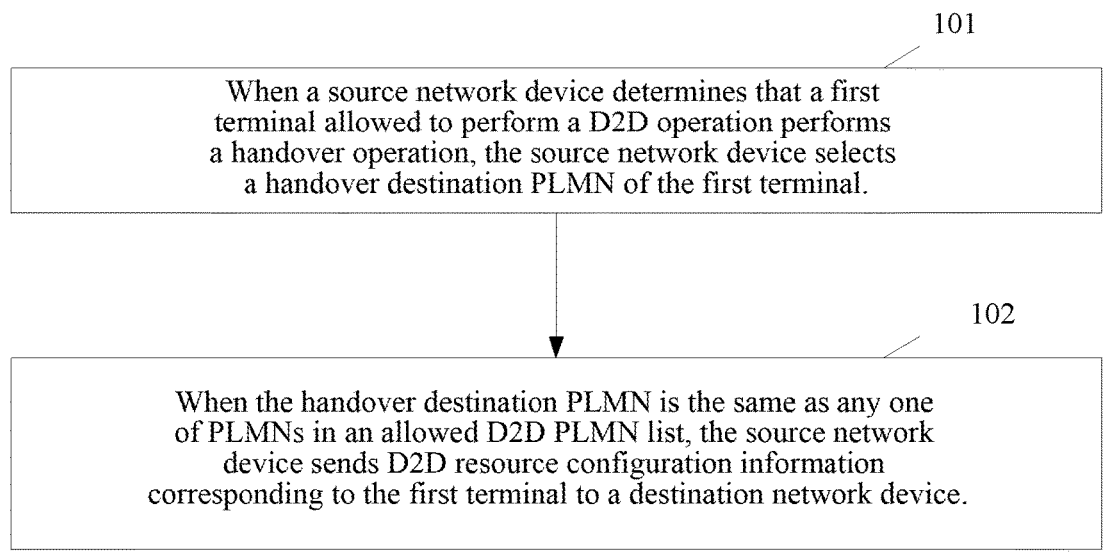
FIG. 1 illustrates a flowchart 1 of a D2D resource configuration information processing method according to the embodiment of the present document.

This embodiment provides an operation process of a D2D resource configuration information processing method on a source network device side. The source network device may be a source base station. As illustrated in FIG. 1, the method includes:

in step 101, when a source network device determines that a first terminal allowed to perform a D2D operation performs a handover operation, the source network device selects a handover destination PLMN of the first terminal.

In step 102, when the handover destination PLMN is the same as any one of PLMNs in an allowed D2D PLMN list, the source network device sends D2D resource configuration information corresponding to the first terminal to a destination network device.

Alternatively, before step 101 is executed, the method may further include: when the source network determines that a serving PLMN of the first terminal to be accessed is the same as any one of PLMNs in the allowed D2D PLMN list, determining the first terminal as a terminal allowed to perform a D2D operation.

Here, the first terminal may be a terminal which is currently accessing to the source network device.

For the sake of convenience in description, in this embodiment, the allowed D2D PLMN list includes: one or more PLMNs allowed to perform a D2D operation.

The D2D operation includes related operations of D2D discovery and communication, or more specifically, monitoring of discovery, receiving of discovery, monitoring of communication, receiving of communication, sending of discovery, sending of communication, etc.

Alternatively, before step 101 is executed, the operation of the source network device may further include: acquiring the allowed D2D PLMN list.

Herein, said acquiring may include: acquiring through interaction with a core network, e.g., independently sending the allowed D2D PLMN list through the core network; or determining a serving PLMN in which current UE receives D2D authorization information as a D2D PLMN.

The method for determining that the first terminal performs the handover operation is the related art. For example, it may be determined when a handover request sent by the first terminal is received or it may be determined when the source network device confirms that the first terminal can perform handover. Thus, no repetitive description is made herein.

The D2D resource configuration information includes: radio resource information needed for discovery and communication; or radio resource information needed for operations of monitoring of discovery, receiving of discovery, monitoring of communication and receiving of communication.

Or, the D2D resource configuration information includes: information of the allowed D2D PLMN list.

Herein, information of a destination PLMN to which the UE is handed over is contained and the D2D resource configuration information of the current UE is contained.

Alternatively, the operation that the source network device determines that the first terminal performs the handover operation may further include the following operation: the source base station judges that the first terminal needs to perform handover, and the source base station selects a suitable destination cell for the first terminal and acquires information of all broadcast PLMN lists of the destination cell (i.e., broadcast PLMN list).

Herein, said acquiring may be acquiring from a network management background or acquiring through an X2 interface message.

Alternatively, the method further includes: using an intersection set between a broadcast PLMN list corresponding to the destination handover cell of the first terminal and a serving PLMN and Equivalent PLMN (EPLMN) list of the first terminal as the handover destination PLMN;

or selecting any one of PLMNs in the serving PLMN and EPLMN list of the first terminal as the handover destination PLMN.

The source network device is a LTE base station under LTE and is a Radio Network Controller (RNC) under UTRAN. The cross-PLMN handover may be S1/X2 handover and may also be handover inside the base station in an LTE scenario. The handover may be cross-RNC handover and may also be handover inside RNC in an UTRAN scenario.

Figure 2:
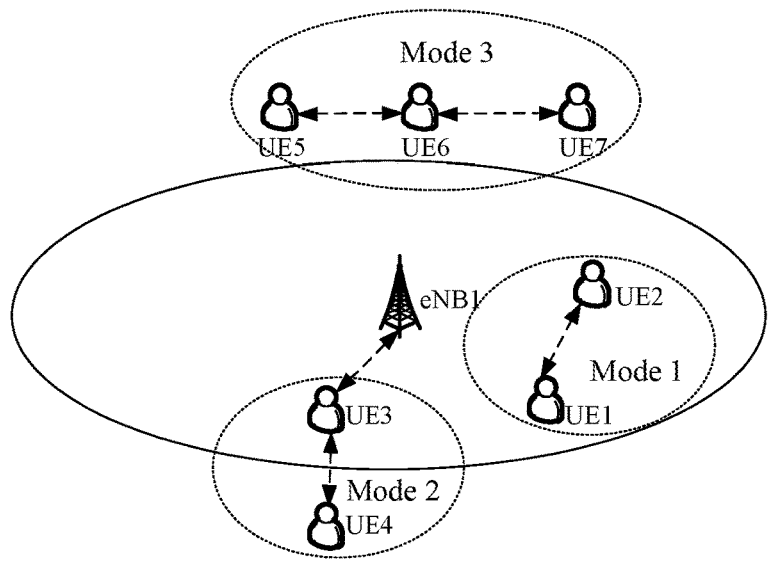
FIG. 2 illustrates application scenarios of D2D.

Application scenarios of D2D in the above-mentioned embodiment will be further introduced below. The application scenarios mainly include the following three scenarios:

1) UE1 and UE2 perform data interaction under the coverage of a cellular network, and user plane data do not pass through network infrastructure, e.g., in mode 1 illustrated in FIG. 2;

2) UE in a weakly covered/non-covered area performs relay transmission, e.g., in mode 2 illustrated in FIG. 2, UE4 with poor signal quality is allowed to communicate with a network through the nearby UE3 under the coverage of the network, helping an operator to expand coverage and improve capacity;

3) Under a situation that the cellular network cannot work normally in case of an earthquake or emergency situation, devices are allowed to directly communicate, e.g., in mode 3 illustrated in FIG. 2, and control planes and user planes among UE5, UE6 and UE7 perform one-hop or multi-hop data communication without going through the network infrastructure.

Embodiment 2

This embodiment provides an operation process of a destination network device side in a D2D resource configuration information processing method. The destination network device may be a destination base station. The method includes the following operations: when a first terminal is handed over to a destination cell, a destination network device receives D2D resource configuration information of the first terminal sent by a source network device; and the destination network device saves and updates the D2D resource configuration information of the first terminal such that UE uses the D2D resource configuration information in a next handover process.

Alternatively, the resource configuration information includes: radio resource information needed for discovery and communication; or more specifically radio resource information needed for operations of monitoring of discovery, receiving of discovery, monitoring of communication and receiving of communication.

Or, the resource configuration information includes: information of the allowed D2D PLMN list.

The handover destination PLMN exists in an intersection set between information of all broadcast PLMN lists (i.e., broadcast PLMN list) of the destination handover cell under the destination network device and information of an allowed EPLMN list of the UE (including a current serving PLMN of the UE).

Embodiment 3

We call one or more PLMNs allowed to perform a D2D operation as a D2D PLMN list, and the information is configured and managed by a core network, and information of the allowed D2D PLMN lists may be independently configured and then sent. A serving PLMN in which current UE receives D2D authorization information may also be implicitly considered as a D2D PLMN.

In a network share scenario, when a current serving PLMN of a first terminal is the same as any one of PLMNs in the allowed D2D PLMN list, the UE is allowed to perform a D2D operation, such as related operations for implementing D2D discovery, communication, monitoring and receiving.

Figure 3:
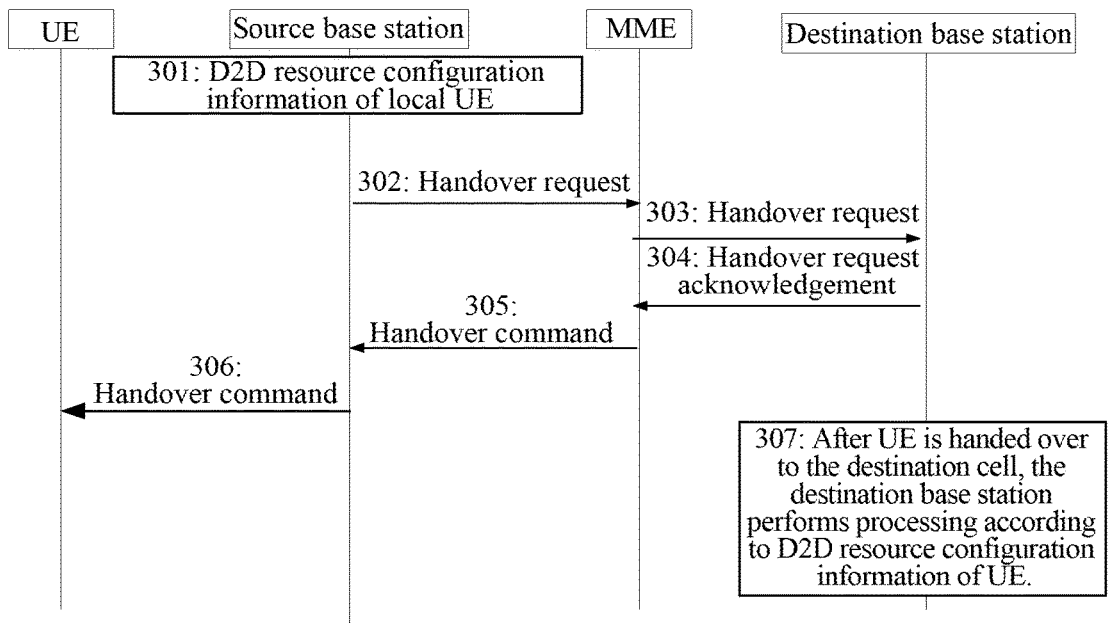
FIG. 3 illustrates a flowchart 2 of a D2D resource configuration information processing method according to the embodiment of the present document.

This embodiment provides a D2D resource configuration information processing method in a handover process in an LTE scenario, an operation process of which is as illustrated in FIG. 3. An S1 interface handover process method includes:

in step 301, a source base station saves D2D resource configuration information directed to a first terminal received from an MME.

Herein, the D2D resource configuration information of the first terminal may include: information of an allowed D2D PLMN list. And, the source base station locally saves information of D2D resources allocated to current UE, and the D2D resources may be different according to different types of contents such as discovery and communication, or more specifically monitoring of discovery, receiving of discovery, monitoring of communication, receiving of communication, sending of discovery and sending of communication.

In step 302, when the source base station determines that the first terminal needs to perform a handover, the source base station selects a suitable destination cell for the first terminal and acquires information of all broadcast PLMN lists of the destination cell; and when the source base station determines that a handover destination PLMN of the first terminal is the same as any one of PLMNs in the allowed D2D PLMN list, a handover request is sent to the MME through an S1 interface, herein the handover request includes information of a destination PLMN to which the first terminal needs to be handed over, and contains the D2D resource configuration information of the current UE.

Herein, the acquiring method may be acquiring from a network management background or acquiring through an X2 interface message.

The resource configuration information includes: radio resource information needed for discovery and communication, or more specifically operations of monitoring of discovery, receiving of discovery, monitoring of communication and receiving of communication;

or, the resource configuration information includes: information of the added allowed D2D PLMN list.

The handover destination PLMN exists in an intersection set between information of all broadcast PLMN lists (i.e., broadcast PLMN list) of the destination handover cell under the destination network device and information of an allowed EPLMN list of the UE (including a current serving PLMN of the UE).

In step 303, after the MME receives the handover request, a handover request is sent to a destination base station through an S1 interface.

In step 304, after the destination base station receives the handover request, resources needed for handover are prepared, and after the preparation is completed, a handover request acknowledgement message is sent to the MME.

In step 305, after the MME receives the handover request acknowledgement message, a handover command is sent to the source base station.

In step 306, after the source base station receives the handover command, the source base station sends the handover command to the first terminal through an air interface.

In step 307, after the first terminal is handed over to the destination cell, the destination base station continuously saves and updates the D2D resource configuration information of the UE such that the resource configuration information is still effective in a next handover process of the UE.

If the serving PLMN after handover is consistent with any one of PLMNs in the information of the allowed D2D PLMN list, the destination base station may continuously allocate related D2D resources for the user according to the resource configuration information of the UE and maintain the current D2D operation of the UE.

Embodiment 4

Figure 4:
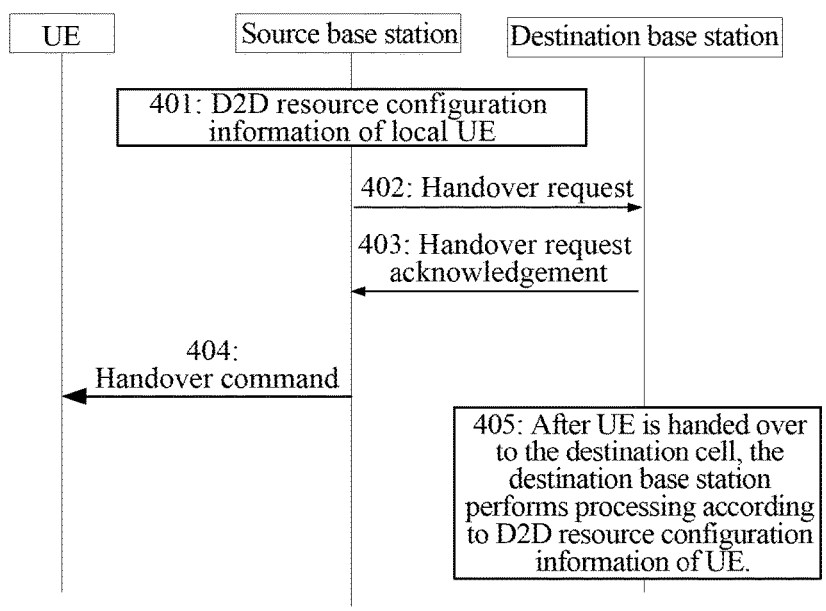
FIG. 4 illustrates a flowchart 3 of a D2D resource configuration information processing method according to the embodiment of the present document.

In a handover process in an LTE scenario provided by this embodiment, supposing that a first terminal is UE, a source network device is a source base station and a destination network device is a destination base station, the processing of D2D resource configuration information is described as follow. With reference to FIG. 4, an X2 handover process includes:

in step 401, a source base station saves D2D resource configuration information directed to UE received from an MME.

The D2D resource configuration information of the UE includes: information of an allowed D2D PLMN list.

The source base station locally saves information of D2D resources allocated to current UE, and the D2D resources may be different according to different types of contents such as discovery and communication, or more specifically monitoring of discovery, receiving of discovery, monitoring of communication, receiving of communication, sending of discovery and sending of communication.

In step 402, when the source base station determines that the UE needs to perform a handover, the source base station selects a destination cell for the UE and acquires information of broadcast PLMN list of the destination cell; and when a handover destination PLMN of the UE is the same as any one of PLMNs in the information of the allowed D2D PLMN list, the source base station sends a handover request to a destination base station corresponding to the destination PLMN through an X2 interface.

Here, the method of acquiring the information of the broadcast PLMN list may be: acquiring from a network management background or acquiring through an X2 interface message.

Herein, the handover request contains: information of the destination PLMN to which the UE needs to be handed over and contains the D2D resource configuration information of the UE.

The resource configuration information includes: radio resource information needed for operations of discovery and communication, or more specifically monitoring of discovery, receiving of discovery, monitoring of communication and receiving of communication, and the information of the allowed D2D PLMN list may also be added into the D2D resource configuration information.

The handover destination PLMN exists in an intersection set between information of all broadcast PLMN lists of the destination handover cell under the destination network device and information of an allowed EPLMN list of the UE (including a current serving PLMN of the UE).

In step 403, after the destination base station receives the handover request, resources needed for handover are prepared, and after the preparation is completed, a handover request acknowledgement message is sent to the source base station.

In step 404, after the source base station receives the message, a handover request is sent to the UE through an air interface.

In step 405, after the UE is handed over to the destination cell, the destination base station may save the D2D resource configuration information of the UE such that the resource configuration information is still effective in a next handover process of the UE.

If the serving PLMN after handover is consistent with any one of PLMNs in the information of the allowed D2D PLMN list, the destination base station may continuously allocate related D2D resources for the user according to the resource configuration information of the UE and maintain the current D2D operation of the UE.

Embodiment 5

Figure 5:
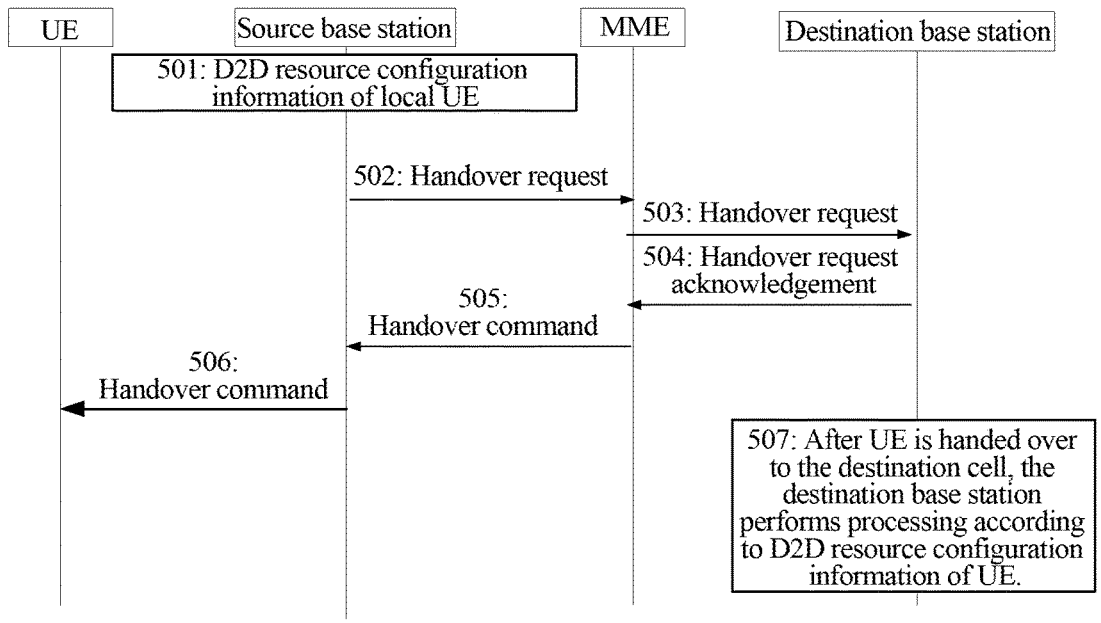
FIG. 5 illustrates a flowchart 4 of a D2D resource configuration information processing method according to the embodiment of the present document.

In a handover process in an LTE scenario provided by this embodiment, supposing that a first terminal is UE, a source network device is a source base station and a destination network device is a destination base station, a D2D resource configuration information transmission process is described as follow. With reference to FIG. 5, a S1 handover process includes:

in step 501, a source base station saves D2D resource configuration information directed to UE.

Herein, the D2D resource configuration information may be D2D resource configuration information directed to the UE received from a MME, including information of an allowed D2D PLMN list.

At the same time, the source base station locally saves information of D2D resources allocated to current UE, and the D2D resources may be different according to different types of contents such as discovery and communication, or more specifically monitoring of discovery, receiving of discovery, monitoring of communication, receiving of communication, sending of discovery and sending of communication.

In step 502, when the source base station determines that the UE needs to perform a handover, the source base station selects a destination cell for the UE and acquires information of all broadcast PLMN lists (i.e., a broadcast PLMN list) of the destination cell; and when a handover destination PLMN of the UE is the same as any one of PLMNs in the allowed D2D PLMN list, the source base station sends a handover request to a MME through an S1 interface.

Here, the acquiring method may be: acquiring from a network management background or acquiring through an X2 interface message.

Herein, the handover request contains: information of the destination PLMN to which the UE needs to be handed over and contains the D2D resource configuration information of the current UE.

The resource configuration information includes: radio resource information needed for operations of discovery and communication, or more specifically monitoring of discovery, receiving of discovery, monitoring of communication and receiving of communication;

or the resource configuration information includes: information of the allowed D2D PLMN list. Herein, the handover destination PLMN exists in information of an allowed EPLMN list of the UE (including a current serving PLMN of the UE).

In step 503, after the MME receives the handover request, a handover request is sent to a destination base station through an S1 interface, herein the handover request contains the information of the destination PLMN to which the UE needs to be handed over and contains the D2D resource configuration information of the current UE.

In step 504, after the destination base station receives the handover request, if the destination PLMN selected by the source base station for the UE does not exist in the information of all broadcast PLMN lists (i.e., broadcast PLMN list) of the destination handover cell, the destination base station may refuse handover at this time, and otherwise, resources needed for handover are prepared by the destination base station, and after the preparation is completed, a handover request acknowledgement message is sent to the MME.

In step 505, the MME sends a handover command to the source base station.

In step 506, after the source base station receives the handover command, the source base station sends the handover command to the terminal through an air interface.

In step 507, after the UE is handed over to the destination cell, the destination base station may continuously save and update the D2D resource configuration information of the UE such that the resource configuration information is still effective in a next handover process of the UE.

If the serving PLMN after handover is consistent with any one of PLMNs in the information of the allowed D2D PLMN list, the destination base station may continuously allocate related D2D resources for the user according to the resource configuration information of the UE and maintain the current D2D operation of the UE.

Embodiment 6

Figure 6:
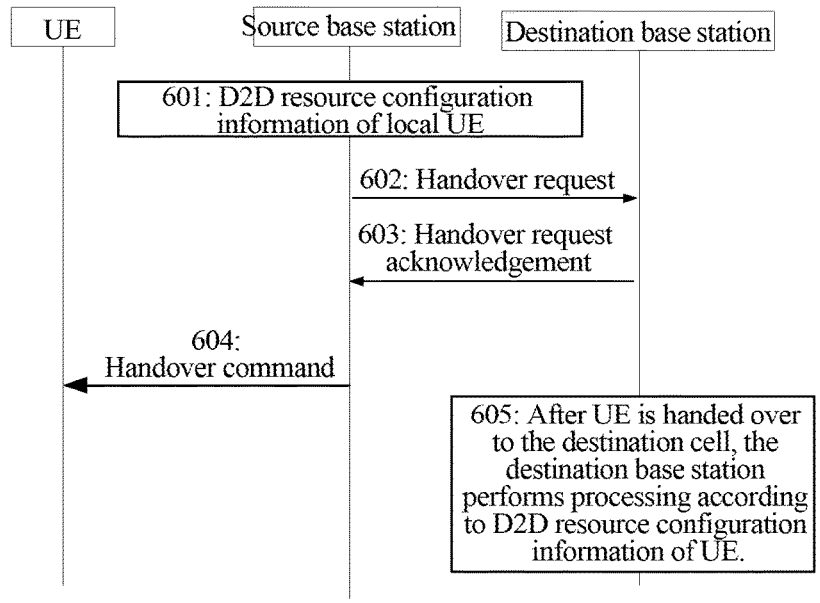
FIG. 6 illustrates a flowchart 5 of a D2D resource configuration information processing method according to the embodiment of the present document.

In a handover process in an LTE scenario, supposing that a first terminal is UE, a source network device is a source base station and a destination network device is a destination base station, a D2D resource configuration information transmission process is described as follow. With reference to FIG. 6, an X2 handover process includes:

In step 601, a source base station saves D2D resource configuration information directed to UE received from a MME.

For example, the D2D resource configuration information may be information of an allowed D2D PLMN list. The source base station locally saves information of D2D resources allocated to current UE, and the D2D resources may be different according to different types of contents such as discovery and communication, or more specifically monitoring of discovery, receiving of discovery, monitoring of communication, receiving of communication, sending of discovery and sending of communication.

In step 602, when the source base station judges that the UE needs to perform a handover, the source base station selects a suitable destination cell for the UE and acquires information of all broadcast PLMN lists (i.e., broadcast PLMN list) of the destination cell; and when a handover destination PLMN of the UE is the same as any one of PLMNs in the allowed D2D PLMN list, the source base station sends a handover request to a destination base station through an X2 interface.

Here, the acquiring method may be: acquiring from a network management background or acquiring through an X2 interface message.

Herein, the handover request contains information of the destination PLMN to which the UE needs to be handed over and contains the immediately reported D2D resource configuration information of the current UE.

The resource configuration information includes: radio resource information needed for operations of discovery and communication, or more specifically monitoring of discovery, receiving of discovery, monitoring of communication and receiving of communication;

or the resource configuration information includes information of the allowed D2D PLMN list. Herein, the handover destination PLMN exists in information of an allowed EPLMN list of the UE (including a current serving PLMN of the UE).

In step 603, after the destination base station receives the handover request, if the destination PLMN selected by the source base station for the UE does not exist in the information of all broadcast PLMN lists (i.e., broadcast PLMN list) of the destination handover cell, the destination base station may refuse handover at this time, and otherwise, resources needed for handover are prepared by the destination base station, and after the preparation is completed, a handover request acknowledgement message is sent to the source base station.

In step 604, after the source base station receives the message, a handover command is sent to the terminal through an air interface.

In step 605, after the UE is handed over to the destination cell, the destination base station may continuously save and update the D2D resource configuration information of the UE such that the resource configuration information is still effective in a next handover process of the UE. If the serving PLMN after handover is consistent with any one of PLMNs in the information of the allowed D2D PLMN list, the destination base station may continuously allocate related D2D resources for the user according to the resource configuration information of the UE and maintain the current D2D operation of the UE.

Alternatively, the above-mentioned method is also applicable to a UTRAN system. In the UTRAN system, an RNC replaces the LTE base station in the above-mentioned handover process, and the S1 interface and the X2 interface are respectively replaced with an Iu interface and an Iur interface.

Embodiment 7

Figure 7:
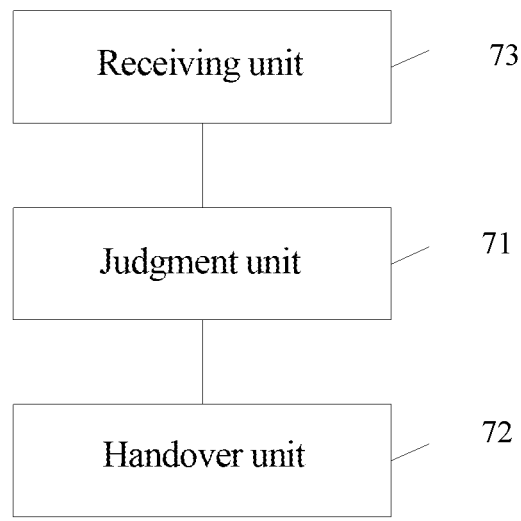
FIG. 7 illustrates a structural schematic diagram 1 of components of a network device according to the embodiment of the present document.

This embodiment of the present document provides a network device, as illustrated in FIG. 7, including:

a judgment unit 71 used to, when it is determined that a first terminal allowed to perform a D2D operation performs a handover operation, select a handover destination PLMN of the first terminal; and a handover unit 72 used to, when the handover destination PLMN is the same as any one of PLMNs in an allowed D2D PLMN list, send D2D resource configuration information corresponding to the first terminal to a destination network device.

The network device further includes: a receiving unit 73 used to acquire the allowed D2D PLMN list, herein acquiring includes: acquiring through interaction with a core network; or determining a serving PLMN in which the first terminal receives D2D authorization information as a D2D PLMN.

Herein, the allowed D2D PLMN list includes: one or more PLMNs authorized to perform a D2D operation.

The D2D resource configuration information includes: radio resource information needed for discovery and communication; or radio resource information needed for operations of monitoring of discovery, receiving of discovery, monitoring of communication and receiving of communication.

Or, the D2D resource configuration information includes: information of the allowed D2D PLMN list.

The handover unit 72 is further used to use an intersection set between a broadcast PLMN list corresponding to the destination handover cell of the first terminal and a serving PLMN and EPLMN list of the first terminal as the handover destination PLMN;

or select any one of PLMNs in the serving PLMN and EPLMN list of the first terminal as the handover destination PLMN.

Embodiment 8

Figure 8:
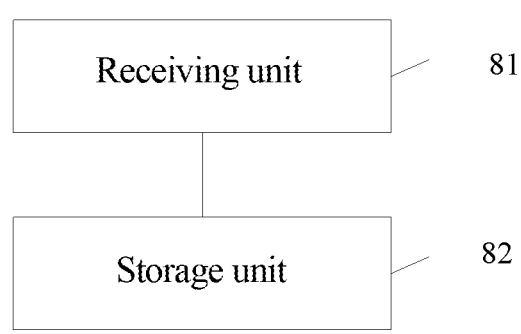
FIG. 8 illustrates a structural schematic diagram 2 of components of a network device according to the embodiment of the present document.

This embodiment of the present document provides a network device, as illustrated in FIG. 8, including:

a receiving unit 81 used to, when a first terminal is handed over to a destination cell managed by the first terminal, receive D2D resource configuration information of the first terminal sent by a source network device; and a storage unit 82 used to save and update the D2D resource configuration information of the first terminal.

The D2D resource configuration information includes: radio resource information needed for discovery and communication; or radio resource information needed for operations of monitoring of discovery, receiving of discovery, monitoring of communication and receiving of communication.

The D2D resource configuration information further includes: information of an allowed D2D PLMN list.

Embodiment 9

Figure 9:
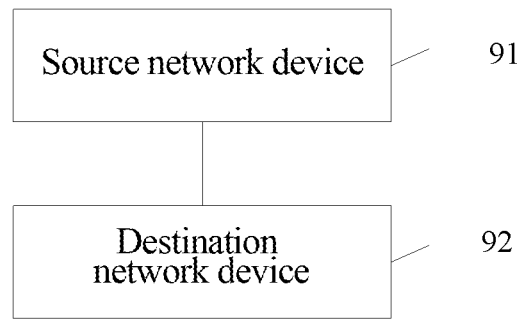
FIG. 9 illustrates a structural schematic diagram of components of a D2D resource configuration information processing system according to the embodiment of the present document.

This embodiment of the present document provides a D2D resource configuration information processing system, as illustrated in FIG. 9, including:

a source network device 91 used to, when it is determined that a first terminal allowed to perform a D2D operation performs a handover operation, select a handover destination PLMN of the first terminal; and when the handover destination PLMN is the same as any one of PLMNs in an allowed D2D PLMN list, send D2D resource configuration information corresponding to the first terminal to a destination network device; and the destination network device 92 used to, when the first terminal is handed over to a destination cell managed by the first terminal, receive the D2D resource configuration information of the first terminal sent by the source network device 91; and save and update the D2D resource configuration information of the first terminal.

The source network device includes: a judgment unit used to, when it is determined that a serving PLMN of the first terminal to be accessed is the same as any one of PLMNs in the allowed D2D PLMN list, determine the first terminal as a terminal allowed to perform a D2D operation; and a handover unit used to, when it is determined that the first terminal allowed to perform the D2D operation performs a handover operation and a handover destination PLMN of the first terminal is the same as any one of PLMNs in the allowed D2D PLMN, send the D2D resource configuration information corresponding to the first terminal to the destination network device 92.

The source network device 91 further includes: a receiving unit used to acquire the allowed D2D PLMN list, herein said acquiring includes: acquiring through interaction with a core network; or determining a serving PLMN in which the first terminal receives D2D authorization information as a D2D PLMN.

The allowed D2D PLMN list include: one or more PLMNs authorized to perform a D2D operation.

The D2D resource configuration information includes: radio resource information needed for discovery and communication;

or radio resource information needed for operations of monitoring of discovery, receiving of discovery, monitoring of communication and receiving of communication.

Or, the D2D resource configuration information includes: information of the allowed D2D PLMN list.

The handover unit is further used to use an intersection set between a broadcast PLMN list, saved in the handover destination network device 92, corresponding to the destination handover cell of the first terminal and an allowed EPLMN list of the first terminal as the destination PLMN.

The destination network device 92 includes:

a receiving unit used to, when the first terminal is handed over to the destination cell managed by the first terminal, receive the D2D resource configuration information of the first terminal sent by the source network device 91; and a storage unit used to save and update the D2D resource configuration information of the first terminal.

The embodiments described above are just preferred embodiments of the present document and are not used for limiting the protection scope of the present document.

In the embodiments provided by the present application, it should be understood that the disclosed devices and methods may be implemented through other modes. The device embodiments described above are just exemplary. For example, division of units is just division according to logic functions, and other division methods may be adopted during actual implementation. For example, a plurality of units or components may be combined or integrated in another system, or some features maybe ignored or are not implemented. In addition, mutual coupling or direct coupling or communication connection illustrated or discussed above may be indirect coupling or communication connection through some interfaces, devices or units, and can be in electrical, mechanical or other forms.

Units which are described therein as discrete components may be or may not be physically separated, and components illustrated as units may be or may not be physical units, i.e., the components may be located at the same place or maybe distributed in a plurality of network units. Partial or all units therein may be selected according to the actual needs to realize the purposes of the solutions of the embodiments.

In addition, each function unit in each embodiment of the present document maybe all integrated in one processing unit, each unit may also be respectively and separately used as a unit, and two or more than two units may also be integrated in one unit. The integrated units not only maybe implemented by means of hardware, but also maybe implemented by means of hardware and software function units.

One skilled in the art can understand that all or partial steps in the above-mentioned method embodiments maybe completed by relevant hardware instructed by a program, and the program maybe stored in a computer readable storage medium, and when the program is executed, the steps of the above-mentioned method embodiments are executed; and the storage medium includes various mediums such as mobile storage devices, Read-Only Memories (ROMs), Random Access Memories (RAMs), magnetic disks or compact disks which can store program codes.

The implementation modes described above are just specific implementation modes of the present document. However, the protection scope of the present document is not limited thereto. One skilled in the art may easily conceive of variations or replacements within the technical scope disclosed by the present document. However, all these variations and replacements shall also be covered by the protection scope of the present document. Therefore, the protection scope of the present document shall be subjected to the protection scope defined by the claims.

INDUSTRIAL APPLICABILITY

According to the D2D resource configuration information processing method, apparatus and system provided by the present document, when a source network device determines that a first terminal allowed to perform a D2D operation performs a handover operation, the source network device selects a handover destination PLMN of the first terminal; and when the handover destination PLMN is the same as any one of PLMNs in an allowed D2D PLMN list, the source network device sends D2D resource configuration information corresponding to the first terminal to a destination network device. The effect that the destination side effectively allocates D2D operation resources for the terminal in time according to the D2D resource configuration information of the terminal is fully realized, the D2D discovery, communication, monitoring and receiving functions of the terminal on the destination side are prevented from being influenced by handover, and the network optimization processing efficiency is improved.

What is claimed is:

1. A Device-to-Device, D2D, resource configuration information processing method, comprising:
   when a source network device determines that a first terminal allowed to perform a D2D operation performs a handover operation, the source network device selecting a handover target Public Land Mobile Network (PLMN) of the first terminal; and when the first terminal is handed over to a target cell, and when the handover target PLMN is the same as any one of PLMNs in an allowed D2D PLMN list, the source network device sending D2D resource configuration information corresponding to the first terminal to a target network device of the target cell, and the target network device saving and updating the D2D resource configuration information of the first terminal wherein the D2D resource configuration information is still effective in a next handover process of the first terminal, if a serving PLMN of the first terminal after handover is consistent with any one of PLMNs in information of the allowed D2D PLMN list, the target network device continuously allocates D2D resources according to the resource configuration information of the first terminal and maintains current D2D operation of the first terminal, wherein the D2D resource configuration information comprises: the information of the allowed D2D PLMN list.

2. The method according to claim 1, wherein the method further comprises: the source network device acquiring the allowed D2D PLMN list, wherein said acquiring comprises: the source network device acquiring through interaction with a core network; or the source network device determining the serving PLMN in which the first terminal receives D2D authorization information as a D2D PLMN.

3. The method according to claim 1, wherein the allowed D2D PLMN list comprises: one or more PLMNs authorized to perform a D2D operation.

4. The method according to claim 1, wherein the D2D resource configuration information comprises: radio resource information needed for discovery and communication;

or radio resource information needed for operations of monitoring of discovery, receiving of discovery, monitoring of communication and receiving of communication.

5. The method according to claim 1, wherein the method further comprises: the source network device using an intersection set between a broadcast PLMN list corresponding to the target cell of the first terminal and an Equivalent PLMN (EPLMN) list allowed by the first terminal as the handover target PLMN;

or wherein the method further comprises: the source network device selecting arbitrarily one PLMN from a serving PLMN and EPLMN list of the first terminal as the handover target PLMN.

6. A D2D resource configuration information processing method, comprising:

when a first terminal is handed over to a target cell, a target network device of the target cell receiving D2D resource configuration information of the first terminal sent by a source network device, wherein the D2D resource configuration information is sent by the source network device when a selected handover target Public Land Mobile Network (PLMN) is the same as any one of PLMNs in an allowed D2D PLMN list; and the target network device saving and updating the D2D resource configuration information of the first terminal wherein the D2D resource configuration information is still effective in a next handover process of the first terminal, if a serving PLMN of the first terminal after handover is consistent with any one of PLMNs in information of the allowed D2D PLMN list, the target network device continuously allocates D2D resources according to the resource configuration information of the first terminal and maintains current D2D operation of the first terminal, wherein the D2D resource configuration information comprises: the information of the allowed D2D PLMN list.

7. The method according to claim 6, wherein the D2D resource configuration information comprises: radio resource information needed for discovery and communication;

or radio resource information needed for operations of monitoring of discovery, receiving of discovery, monitoring of communication and receiving of communication.

8. A network device, comprising:

a judgment circuit configured to, when it is determined that a first terminal allowed to perform a D2D operation performs a handover operation, select a handover target Public Land Mobile Network (PLMN) of the first terminal; and a handover circuit configured to, when the handover target PLMN is the same as any one of PLMNs in an allowed D2D PLMN list, send D2D resource configuration information corresponding to the first terminal to a target network device, wherein the D2D resource configuration information of the first terminal is saved and updated by the target network device wherein the D2D resource configuration information is still effective in a next handover process of the first terminal, if a serving PLMN of the first terminal after handover is consistent with any one of PLMNs in information of the allowed D2D PLMN list, the target network device continuously allocates D2D resources according to the resource configuration information of the first terminal and maintains current D2D operation of the first terminal, wherein the D2D resource configuration information comprises: the information of the allowed D2D PLMN list.

9. The network device according to claim 8, wherein the network device further comprises: a receiving circuit configured to acquire the allowed D2D PLMN list, wherein said acquiring comprises: acquiring through interaction with a core network; or determining a serving PLMN in which the first terminal receives D2D authorization information as a D2D PLMN.

10. The network device according to claim 9, wherein the allowed D2D PLMN list comprises: one or more PLMNs authorized to perform a D2D operation;

or wherein the D2D resource configuration information comprises: radio resource information needed for discovery and communication;

or radio resource information needed for operations of monitoring of discovery, receiving of discovery, monitoring of communication and receiving of communication.

11. The network device according to claim 8, wherein the handover circuit is configured to use an intersection set between a broadcast PLMN list corresponding to the target cell of the first terminal and a serving PLMN and an Equivalent PLMN (EPLMN) list allowed by the first terminal as the handover target PLMN;
or
wherein the handover circuit is configured to select arbitrarily one PLMN from a serving PLMN and EPLMN list of the first terminal as the handover target PLMN.

12. A network device, comprising:
a receiving circuit, when a first terminal is handed over to a target cell, the receiving circuit of the network device of the target cell is configured to receive D2D resource configuration information of the first terminal sent by a source network device; and
a storage circuit configured to save and update the D2D resource configuration information of the first terminal wherein the D2D resource configuration information is still effective in a next handover process of the first terminal, if a serving Public Land Mobile Network (PLMN) of the first terminal after handover is consistent with any one of PLMNs in information of an allowed D2D PLMN list, the network device is configured to continuously allocate D2D resources according to the resource configuration information of the first terminal and maintain current D2D operation of the first terminal,
wherein the D2D resource configuration information comprises: the information of the allowed D2D PLMN list.

13. The network device according to claim 12, wherein the D2D resource configuration information comprises: radio resource information needed for discovery and communication;
or radio resource information needed for operations of monitoring of discovery, receiving of discovery, monitoring of communication and receiving of communication.

14. A D2D resource configuration information processing system, comprising:
a source network device configured to, when it is determined that a first terminal allowed to perform a D2D operation performs a handover operation, select a handover target Public Land Mobile Network (PLMN) of the first terminal; and
a target network device, when the first terminal is handed over to a target cell, the target network device of the target cell is configured to receive D2D resource configuration information of the first terminal sent by the source network device;
the source network device is further configured to, when the handover target PLMN is the same as any one of PLMNs in an allowed D2D PLMN list, send D2D resource configuration information corresponding to the first terminal to a target network device; and
the target network device is further configured to save and update the D2D resource configuration information of the first terminal wherein the D2D resource configuration information is still effective in a next handover process of the first terminal, if a serving PLMN of the first terminal after handover is consistent with any one of PLMNs in information of the allowed D2D PLMN list, the target network device is further configured to continuously allocate D2D resources according to the resource configuration information of the first terminal and maintain current D2D operation of the first terminal,
wherein the D2D resource configuration information comprises: the information of the allowed D2D PLMN list.

15. The system according to claim 14, wherein the source network device comprises:
a judgment circuit configured to, when it is determined that the serving PLMN of the first terminal to be accessed is the same as any one of PLMNs in the allowed D2D PLMN list, determine the first terminal as a terminal allowed to perform a D2D operation.

16. The system according to claim 15, wherein the source network device further comprises: a receiving circuit configured to acquire the allowed D2D PLMN list, wherein said acquiring comprises: acquiring through interaction with a core network; or determining the serving PLMN in which the first terminal receives D2D authorization information as a D2D PLMN.

17. The system according to claim 15, wherein the allowed D2D PLMN list comprises: one or more PLMNs authorized to perform a D2D operation.

18. The system according to claim 15, wherein the D2D resource configuration information comprises: radio resource information needed for discovery and communication;
or radio resource information needed for operations of monitoring of discovery, receiving of discovery, monitoring of communication and receiving of communication.

19. The system according to claim 15, wherein the source network device further comprises a handover circuit which is configured to use an intersection set between a broadcast PLMN list corresponding to the target cell of the first terminal and a serving PLMN and an Equivalent PLMN (EPLMN) list allowed by the first terminal as the handover target PLMN;
or
wherein the source network device further comprises a handover circuit which is configured to select arbitrarily one PLMN from a serving PLMN and EPLMN list of the first terminal as the handover target PLMN.

* * * * *